(12) United States Patent
Kunkel

(10) Patent No.: US 6,468,419 B1
(45) Date of Patent: *Oct. 22, 2002

(54) UV TREATMENT DEVICE WITH TIME DELAY OF WATER FLOWING THERE THROUGH

(75) Inventor: Horst Kunkel, Stuttgart (DE)

(73) Assignee: Hansa Metallwerke AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/486,197
(22) PCT Filed: Jul. 14, 1998
(86) PCT No.: PCT/EP98/04359
§ 371 (c)(1), (2), (4) Date: May 16, 2000
(87) PCT Pub. No.: WO99/10281
PCT Pub. Date: Mar. 4, 1999

(30) Foreign Application Priority Data

Aug. 22, 1997 (DE) .......................................... 197 36 636

(51) Int. Cl.$^7$ ................................................ C02F 1/32
(52) U.S. Cl. ........................... 210/90; 210/97; 210/138; 210/192; 422/186.3; 250/436
(58) Field of Search .............................. 210/90, 97, 748, 210/741, 138, 192; 422/24, 186.3; 250/436

(56) References Cited

U.S. PATENT DOCUMENTS 4,694,179 A * 9/1987 Lew et al.
4,849,100 A * 7/1989 Papandrea
5,547,590 A * 8/1996 Szabo

FOREIGN PATENT DOCUMENTS

| DE | 3840276 A | * | 5/1990 |
| DE | 3924350 A | * | 1/1991 |
| FR | 2414480 | * | 8/1979 |
| GB | 2127177 A | * | 4/1984 |

* cited by examiner

Primary Examiner—Joseph W. Drodge
Assistant Examiner—Terry K Cecil

(57) ABSTRACT

A device for degerminating water passing through a sanitary appliance includes a housing 23 through which water can flow, a water outlet 3 and a UV lamp 22 located therein that radiates water flowing through the housing and a filtering device 21 provided in the housing in order to destroy the micro-organisms in the water and/or the filtering device. The energy supply circuit of the UV-lamp is controlled by an electronic control unit 10, which also controls a valve driver circuit for a magnetic valve 6 located in a fresh water feed pipe. The electronic control unit activates the energy supply circuit when it receives a signal for switching on the UV-lamp. The valve driver circuit is activated after a time delay, ensuring that when the magnetic valve opens letting water flow through the housing to the outlet of the appliance, the UV-lamp has reached its full radiation capacity.

5 Claims, 2 Drawing Sheets

UV TREATMENT DEVICE WITH TIME DELAY OF WATER FLOWING THERE THROUGH

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a device for sterilizing water flowing through a sanitary appliance, having a) a housing, which comprises an inlet and an outlet for the water;

b) a UV lamp, which is disposed inside the housing and the radiation of which is directed towards the water flowing through and optionally towards a filtering apparatus likewise disposed in the housing;

c) a power supply circuit for the UV lamp;

d) a device for producing a switch-on signal for the power supply circuit of the UV lamp;

e) a solenoid valve, which is situated in the fresh water supply conduit and energized by a valve driver circuit;

f) a control circuit, which is connected to the valve driver circuit of the solenoid valve, the power supply circuit for the UV lamp and the device for producing a switch-on signal for the UV lamp and is so designed that it activates the driver circuit for the solenoid valve only with a specific time delay after the power supply circuit for the UV lamp;

g) a valve, which is operable by the user, in the fresh water supply conduit;

h) a pressure sensor situated between the solenoid valve and the user-operable valve in the fresh water supply conduit.

In recent years the dangers arising in the field of sanitation from water contaminated with micro-organisms, in particular bacteria, amoebae or other monocellular organisms, have become ever clearer. For said reason, increased importance is being attached to water sterilization. In said connection, there have been reports of experiments to sterilize flowing water through exposure to UV light, which is of a wavelength suitable for killing micro-organisms carried along in the water. To extend the retention time of said micro-organisms in the region of the UV lamp, an additional filtering apparatus may be used.

2. Technical Field

In the devices known from said experiments, the UV lamp was activated when the water flow is set in operation, e.g. by means of a mechanical switch which was mechanically connected to the operating element of the valve controlling the water flow. However, since the UV lamp upon activation does not immediately operate at full radiant power, with said known devices the sterilizing capacity in the initial phase after switching-on was inadequate.

A generic apparatus is known from DE 39 24 350 A1. There, a switch, which via a control circuit 2 activates a UV lamp, is used as a device for producing a switch-on signal. Further devices for sterilizing water with the aid of a UV lamp, which use control circuits which activate the valve driver circuit for the inlet valve in the water supply conduit with a time delay compared to the switching-on of the UV lamp, are known from GB 21 27 177 A, FR 24 14 480 A and DE 38 40 276 A.

Upon the occurrence of a "switch-on signal" indicating the request of a user to draw off water, the water flow is not immediately set in operation. Rather, the control circuit first ensures that the power supply circuit for the UV lamp is activated. The UV lamp is therefore ignited and comes within a few seconds up to operating temperature, after which its operating state is stabilized and the full luminous capacity is attained. It is only then, i.e. after a specific time delay, that the control electronics also activate the valve driver circuit for the additional solenoid valve provided according to the invention; it is only then that water starts to flow and then encounters inside the housing of the device a UV lamp which is fully activated and hence operating at maximum sterilizing capacity.

In the known sterilizing devices, the switch-on signal for the UV lamp is produced by means of a switch which is to be separately operated. If, e.g. out of ignorance, said switch is not operated, it is impossible to draw off water.

SUMMARY OF THE INVENTION

The object of the present invention is to refine a device of the type described initially in such a way that automatic activation of the UV lamp is guaranteed in response to a draw-off request by the user, which is effected in the manner customary with sanitary appliances through opening of the user-operable valve in the fresh water supply.

Said object is achieved according to the invention in that i) the solenoid valve is disposed upstream of the valve, which is operable by the user, in the fresh water supply conduit and that j) a signal of the pressure sensor ascertaining a pressure drop is utilized as the switch-on signal for the power supply circuit.

The solenoid valve therefore serves simultaneously as part of the device for producing a switch-on signal. Said device uses, as a "controlled variable" indicating the request of the user to start and end a dispensing operation, the pressure inside the portion of the fresh water supply conduit lying between the additional solenoid valve and a valve operable by the user. By "operable by the user" is meant not only the direct mechanical operation, e.g. by means of the lever of a single-lever mixer, by the user. In the context of the present invention, a solenoid valve actuated without contact is also "operable by the user".

The time delay between switching on the power supply circuit for the UV lamp and activating the valve driver circuit for the solenoid valve should be, say, in the order of magnitude of 0.2 to 3 seconds.

It is advisable to provide the device according to the invention with a display, which is activated immediately upon the occurrence of a switch-on signal. When said display lights up, the user knows that the device is working even though the water does not start to flow straightaway. This prevents irritation on the part of the user.

BRIEF DESCRIPTION OF THE DRAWINGS

An embodiment of the invention is described in detail below with reference to the drawings.

DETAILED DESCRIPTION OF THE INVENTION

Figure 1:
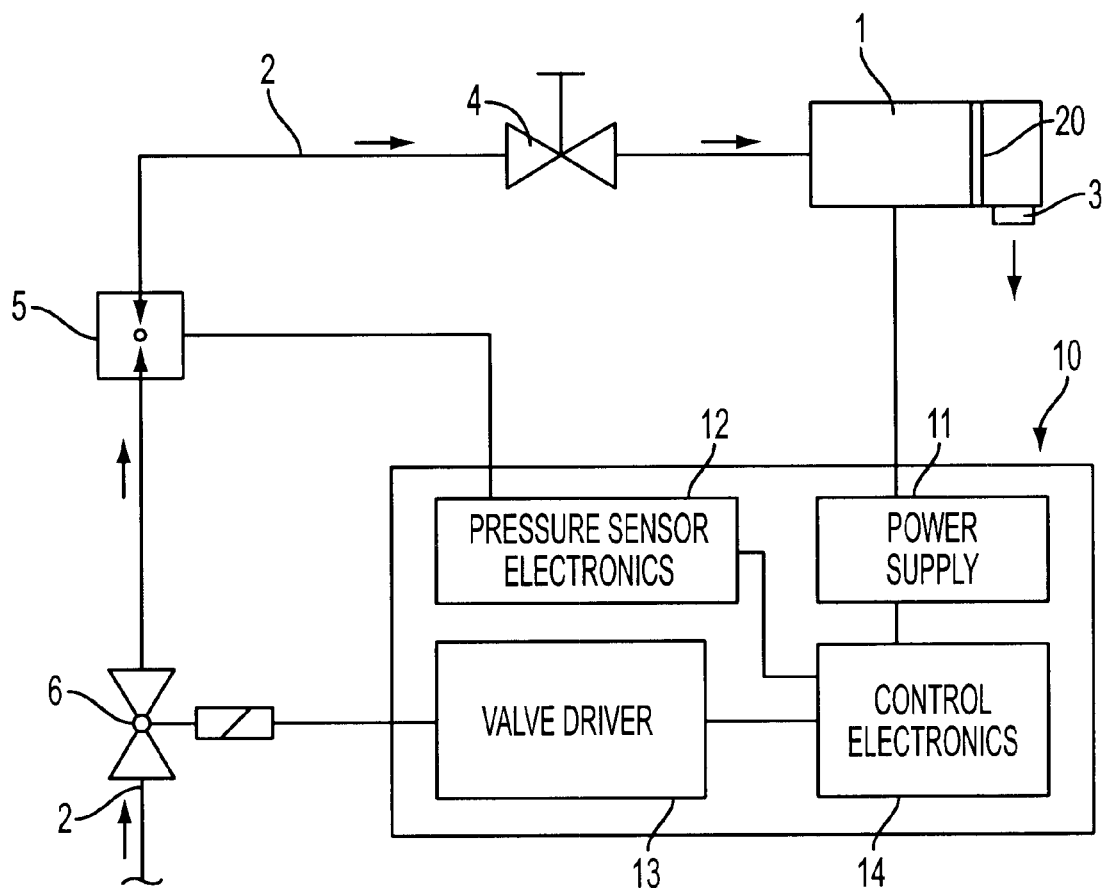
FIG. 1 diagrammatically shows a block diagram and the associated hardware components of a device for sterilizing and filtering water flowing through a sanitary draw-off appliance.

In FIG. 1 a sanitary draw-off appliance is diagrammatically illustrated, which in the illustrated embodiment may be thought of a s a bathtub outlet but may alternatively be part of a complete sanitary appliance containing the valve, e.g. a single-lever mixer. Instead of the bathtub outlet 1, the appliance may alternatively be a shower or the like.

The bathtub outlet 1 is supplied via the fresh water supply conduit 2 with water which may contain micro-organisms such as amoebae, bacteria or similar monocellular organisms. To eliminate the latter, a UV lamp and a filtering apparatus (not shown) are integrated inside the bathtub outlet 1. The UV lamp irradiates the water flowing through as well as the filtering apparatus and thereby kills the microorganisms which are carried along by the water and/or retained by the filtering apparatus. Extensively germfree, filtered water therefore passes out of the outlet opening 3 of the bathtub outlet 1.

The drawing shows upstream of the bathtub outlet 1 a valve 4 operable by the user, which may be either a valve operated mechanically through the direct action of force of the user or a solenoid valve indirectly controlled without contact by the user. Further upstream, a pressure sensor 5 is installed in the fresh water supply conduit 2; the fresh water is fed to said pressure sensor by a solenoid valve 6, which is the first "element" in the fresh water supply conduit 2.

The circuit arrangement used to operate the previously described hardware components 1 to 6 is denoted as a whole in the drawing by the reference character 10. The circuit arrangement 10 comprises a power supply circuit 11 for the UV lamp integrated in the bathtub outlet 1, pressure sensor electronics 12 which process the pressure signal supplied by the pressure sensor 5, a valve driver circuit 13 which energizes the solenoid valve 6, and control electronics 14 which control the interaction of the previously mentioned part-components of the circuit arrangement 10.

The previously described circuit arrangement operates as follows:

The components 5 and 6 lying upstream of the user-operated valve 4 inside the fresh water supply conduit 2 serve as a device for producing a switch-on signal in the following manner:

As the initial situation, it is assumed that the valve 4 operated by the user is closed, i.e. no water is flowing out of the outlet opening 3. The pressure sensor 5 installed in the conduit portion between the upstream solenoid valve 6 and the user-operated valve 4 measures the full system pressure, which still exists from the preceding working cycle. When the valve 4 is then opened through the action of the user, the pressure drops dramatically at the pressure sensor 5. The pressure sensor electronics 12 supply a corresponding signal to the control electronics 14, which identify the user's "request" to draw off water from the bathtub outlet 1. As the solenoid valve 6 is still closed, initially no water flows out of the outlet opening 3 of the bathtub outlet 1. However, immediately upon the occurrence of the signal of the pressure sensor 5 indicating the pressure drop, the control electronics 14 activate the power supply circuit 11 for the UV lamp situated in the bathtub outlet 1. The UV lamp is therefore ignited at said instant. Immediately after ignition, however, the UV lamp has still not developed its full capacity, which would be sufficient to reliably kill the micro-organisms carried along by the water. The control electronics 14 therefore wait for a specific length of time, which empirically is enough to allow the UV lamp to reach its full capacity. It is only after said time delay that the control electronics 14 activate the valve driver circuit 13, which then energizes the solenoid valve 6 so that the latter opens. Fresh water then flows through the fresh water supply conduit 2, past the pressure sensor 5 and through the valve 4, which has already been opened by the user, to the bathtub outlet 1 where it may flow past the UV lamp operating at full capacity, through the filtering apparatus and, having thus been purified, out of the outlet opening 3 of the bathtub outlet 1.

When the user requires no more water, he then (again directly or indirectly) closes the valve 4. The pressure sensor 5 senses the pressure rise caused thereby. The corresponding signal is supplied by the pressure sensor electronics 12 to the control electronics 14. The latter then close the solenoid valve 6 by means of a corresponding signal supplied to the valve driver circuit 13 and moreover—optionally after a specific time delay—deactivate the power supply circuit 11 for the UV lamp situated in the bathtub outlet 1.

Figure 2:
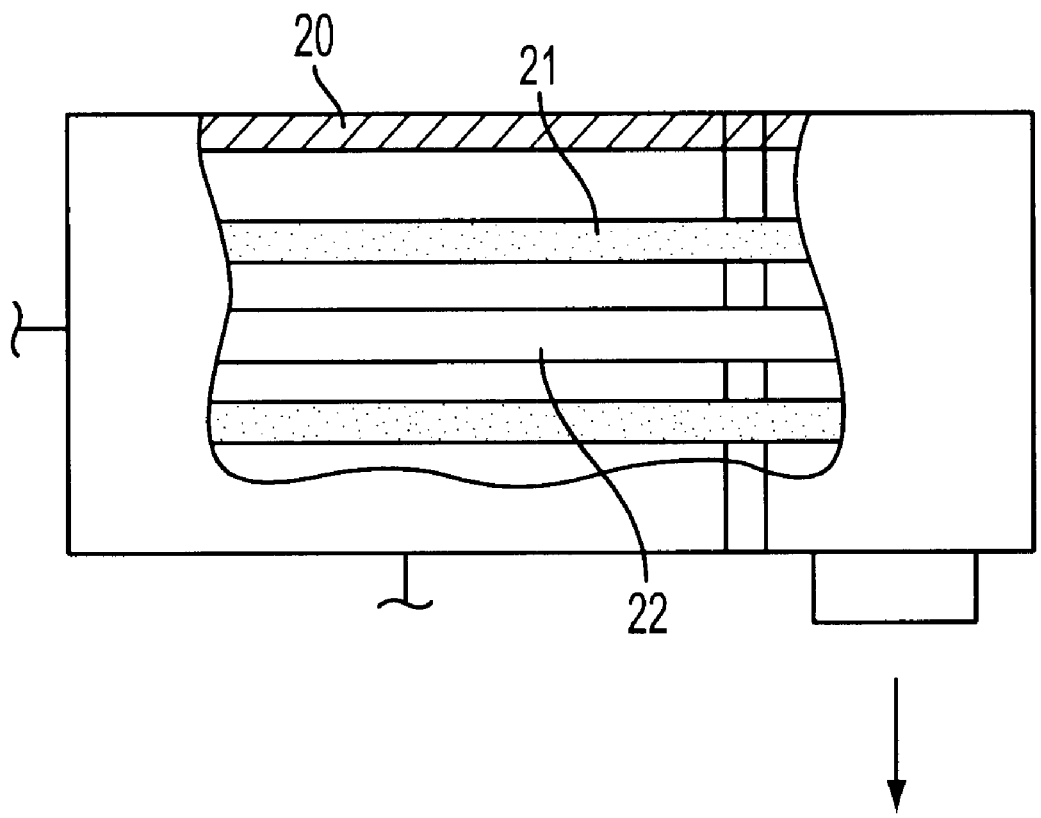
FIG. 2 shows a housing that contains a filtering apparatus and a UV lamp.

FIG. 2 shows a housing 23 that contains a filtering apparatus 21 and a UV lamp 22.

So that the user is not irritated by the delay before the water starts to flow, a display 20 is integrated in the bathtub outlet 1. Said display lights up, as soon as the UV lamp is activated, and indicates to the user that the device is working.

What is claimed is:
1. Device for sterilizing water flowing through a sanitary appliance, having:
   a) a housing, which comprises an inlet and an outlet for the water;
   b) a UV lamp, which is disposed inside the housing and the radiation of which is directed towards the water flowing through the housing;
   c) a power supply circuit for the UV lamp;
   d) a device for producing a switch-on signal for the power supply circuit of the UV lamp;
   e) a solenoid valve, which is situated in a fresh water supply conduit leading to the housing and is energized by a valve driver circuit;
   f) a control circuit, which is connected to the valve driver circuit of the solenoid valve, the power supply circuit for the UV lamp and the device for producing a switch-on signal and is so designed that it activates the valve driver circuit only with a specific time delay after the power supply circuit for the UV lamp is activated;
   g) a valve, which is operable by the user, in the fresh water supply conduit;
   h) a pressure sensor situated upstream from the UV lamp and between the solenoid valve and the user-operable valve in the fresh water supply conduit;
wherein
   i) the solenoid valve is disposed upstream of the valve, which is operable by the user, in the fresh water supply conduit and
   j) a signal of the pressure sensor ascertaining a pressure drop is utilized as the switch-on signal of the power supply circuit for the UV amp.

2. Device according to claim 1, wherein the specific time delay is between 0.2 to 3 seconds.

3. Device according to claim 1, further comprising a display, which is activated immediately upon the occurrence of the switch-on signal.

4. Device according to claim 1, wherein the radiation of the UV lamp is disposed towards a filtering apparatus disposed in the housing.

5. Device for sterilizing water flowing through a sanitary appliance, having
   a) a housing, which comprises an inlet and an outlet for the water;
   b) a UV lamp, which is disposed inside the housing and the radiation of which is directed towards the water flowing through the housing;
   c) a power supply circuit for the UV lamp;
   d) a device for producing a switch-on signal for the power supply circuit of the UV lamp;
   e) a solenoid valve, which is situated in a fresh water supply conduit leading to the housing and is energized by a valve driver circuit;
   f) a control circuit, which is connected to the valve driver circuit of the solenoid valve, the power supply circuit for the UV lamp and the device for producing a switch-on signal and is so designed that it activates the valve driver circuit only with a specific time delay after the power supply circuit for the UV lamp is activated;
   g) a valve, which is operable by the user, in the fresh water supply conduit;
   h) a pressure sensor situated upstream from the UV lamp and between the solenoid valve and the user-operable valve in the fresh water supply conduit;
   wherein
   i) the solenoid valve is disposed upstream of the valve, which is operable by the user, in the fresh water supply conduit;
   j) a signal of the pressure sensor ascertaining a pressure drop is utilized as the switch-on signal of the power supply circuit for the UV lamp; and
   k) the device for producing a switch-on signal for the power supply circuit of the UV lamp is operationally coupled to the valve which is operable by the user and situated in the fresh water supply conduit.

* * * * *